United States Patent [19]

Yamaguchi

[11] 4,325,347
[45] Apr. 20, 1982

[54] METHOD OF CONTROLLING FLUID FLOW RATE USING ON-OFF TYPE ELECTROMAGNETIC VALVE

[75] Inventor: Hiroshi Yamaguchi, Yokohama, Japan

[73] Assignee: Nissan Motor Company, Limited, Yokohama, Japan

[21] Appl. No.: 132,297

[22] Filed: Mar. 20, 1980

[30] Foreign Application Priority Data

Mar. 29, 1979 [JP] Japan ................................. 54-37543

[51] Int. Cl.³ ........................................... F02M 25/06
[52] U.S. Cl. ....................................... 123/571; 137/1; 137/624.15; 137/487.5
[58] Field of Search ..................... 137/624.15, 624.13, 137/487.5, 486, 1, 8, 14; 251/129; 123/198 D, 571

[56] References Cited

U.S. PATENT DOCUMENTS

| | | | |
|---|---|---|---|
| 2,741,088 | 4/1956 | Andrews | 137/624.15 X |
| 3,476,128 | 11/1969 | Barker | 137/624.15 X |
| 3,800,794 | 4/1974 | Georgi | 137/487.5 X |
| 4,018,241 | 4/1977 | Sodal | 137/487.5 X |
| 4,170,973 | 10/1979 | Nohira | 123/571 |

FOREIGN PATENT DOCUMENTS

| | | |
|---|---|---|
| 877681 | 7/1953 | Fed. Rep. of Germany . |
| 2529278 | 1/1977 | Fed. Rep. of Germany . |
| 66514 | 4/1969 | German Democratic Rep. . |

*Primary Examiner*—Alan Cohan
*Attorney, Agent, or Firm*—Schwartz, Jeffery, Schwaab, Mack, Blumenthal & Koch

[57] ABSTRACT

In a method of controlling the rate of flow of a fluid by using an electromagnetic flow control valve of the on-off functioning type and by operating this valve with a pulse signal of which duty is regulated, the flow rate is minimized or maximized by making the duty of the pulse signal slightly greater than 0%, e.g. 2%, or slightly smaller than 100%, e.g. 98%, instead of making it 0% or 100% as in conventional control methods. A principal advantage of such shifting of the minimum and maximum duty values respectively from 0% and 100% is the possibility of easily discriminating a failure, for example, in the supply of the pulse signal from proper minimization or maximization of the duty of the pulse signal.

9 Claims, 6 Drawing Figures

METHOD OF CONTROLLING FLUID FLOW RATE USING ON-OFF TYPE ELECTROMAGNETIC VALVE

BACKGROUND OF THE INVENTION

This invention relates to an improved method of controlling the rate of a fluid flow by means of an electromagnetic flow control valve of the on-off functioning type.

It is a well known technique to control the rate of flow of a fluid, either gas or liquid, by using an electromagnetic flow control valve of the on-off functioning type and by operating this valve with a pulse signal of which duty, that is, the proportion of pulse durations to pulse intervals during a definite amount of time, is varied thereby varying the flow rate proportionally to the duty of the pulse signal. Usually the pulse signal is of a constant frequency so that the duty is varied by pulse duration modulation. In practical applications, an advantage of this technique over the use of an electromagnetic flow control valve of the proportional type such as an electric-hydraulic servo valve, which exhibits a strictly linear control characteristic in accordance with the level of a control signal, is the possibility of providing relatively inexpensive flow control systems. In the automobile industries, for example, this technique has been employed to control the flow rate of either auxiliary air introduced to regulate the air-to-fuel ratio or exhaust gas recirculated to reduce the emission of nitrogen oxides.

In conventional flow rate control methods utilizing an electromagnetic flow control valve of the on-off functioning type, it is usual to render the flow rate maximum or minimum by maintaining the duty of the control pulse signal at 100% or at 0%, meaning that temporarily the pulse signal takes the form of a continuous signal of a constant level, thereby keeping the electromagnetic valve in the ON-state or in the OFF-state.

As a problem in the practice of such control methods, under the 100% duty and 0% duty conditions it is difficult to ascertain properness of the supply of the pulse signal and/or the function of the electromagnetic valve. For example, there is the possibility of misunderstanding that the duty of the control pulse signal is kept at 0% while in reality the supply of the intended control pulse signal is interrupted by failure of the control circuit. It may be wished to check the function of the electromagnetic valve by detecting changes in the voltage at the input terminals of the electromagnetic valve (the changes corresponding to the frequency of the pulse signal) with an ordinary instrument such as a counter. While the duty of the control pulse signal is either 100% or 0%, however, there occurs no change in the voltage at the terminals so that the counter continues to give a reading representative of a state just before the shift of the duty to 100% or 0%. Hence, it is impossible to discriminate between the 100% or 0% duty condition and the failure of the signal generating circuit.

SUMMARY OF THE INVENTION

It is an object of the present invention to provide a practical solution to the above described problem in a method of controlling the rate of a fluid flow by controlling the duty of a constant frequency pulse signal which is supplied to an electromagnetic flow control valve of the on-off functioning type.

More particularly, an object of the invention is to provide an improved method of controlling the operation of the electromagnetic valve in the above described flow rate control method, which improvement enables to easily and correctly recognize whether the electromagnetic valve is properly functioning with the supply of an intended pulse signal or there is any failure or malfunction of the pulse signal generating circuit even under the maximum or minimum flow rate condition, practically without adversely affecting the flow rate controlling capability of the electromagnetic valve.

The present invention provides a method of controlling the rate of flow of a fluid by operating an electromagnetic flow control valve of the on-off functioning type with a constant frequency pulse signal and regulating the duty of the pulse signal thereby regulating the proportion of the duration of the open state to duration of the closed state of the electromagnetic valve. As the improvement according to the invention, the minimum value of the duty of the pulse signal for minimizing, or maximizing, the flow rate is made to be greater than 0% but not greater than a first critical value which is slightly greater than 0%, and the maximum value of the duty of the pulse signal for maximizing, or minimizing, the flow rate is made to be smaller than 100% but not smaller than a second critical value which is slightly smaller than 100%.

Preferably, the first critical value of the duty is 3% and the second critical value is 97%. Also preferably, the minimum and maximum values of the duty are made to be predetermined definite values, respectively.

The present invention is based on the fact that, due to the inertia of the moving elements of the electromagnetic valves of the on-off functioning type, the flow rate minimizes (or maximizes, depending on the design of the electromagnetic valve) even when the duty of the pulse signal is slightly greater than 0% and maximizes (or minimizes, depending on the design of the electromagnetic valve) even when the duty is slightly smaller than 100%.

A primary advantage of the control method according to the invention is the possibility of easily discriminating a failure, for example, in the supply of the pulse signal from proper minimization or maximization of the duty of the pulse signal by detecting periodical changes in voltage at the input terminals of the electromagnetic valve, because a control pulse signal in the method of the invention does not turn into the form of a continuous signal even when the flow rate is regulated to the minimum or maximum value.

DESCRIPTION OF THE PREFERRED EMBODIMENTS

Figure 1:
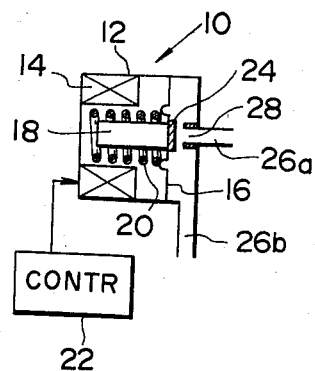
FIG. 1 is a schematic and sectional view of a conventional electromagnetic flow control valve of the on-off functioning type.

FIG. 1 shows a fundamental construction of a conventional electromagnetic flow control valve 10 of the on-off functioning type. Numeral 12 indicates a valve housing in which is fixedly installed a solenoid coil 14. A flexible diaphragm 16 partitions off a part of the interior of the housing 12 such that the electromagnetic elements of the valve 10 is isolated from a fluid flow to be controlled. A movable iron core 18 is associated with the coil 14 in the usual manner and fixed at its one end to the diaphragm 16, and a return spring 20 is arranged to bias the diaphragm 16, so that the iron core 18 makes a reciprocative movement in the on-and-off manner, accompanied by simultaneous deflection of the diaphragm 16, as the coil 14 is energized and deenergized by a pulse signal supplied from a control circuit 22.

On the opposite side, a valve member 24 is fixed to the diaphragm 16 so as to intermittently open and close a port 28 which constitutes a junction of fluid passages 26a and 26b in accordance with the movement of the iron core 18. Therefore, the rate of a flow of either a liquid or gas through the passages 26a, 26b can be controlled by varying the duty of the pulse signal produced in the control circuit 22 thereby regulating the proportion of the duration of the ON-state (open state in this case) of the electromagnetic valve 10 to the duration of OFF-state (closed state in this case).

Figure 2:
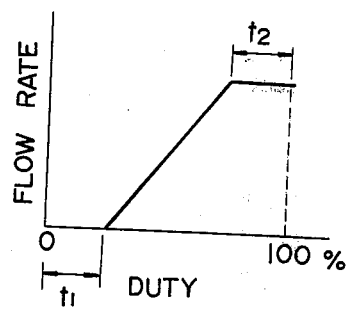
FIG. 2 is a chart explanatorily showing the operating characteristic of the electromagnetic valve of FIG. 1.

In the practical sense, the rate of flow of a fluid controlled by this type of electromagnetic valve 10 varies proportionally to the duty of the control pulse signal applied to the electromagnetic valve 10. In the strictest sense, however, the flow rate does not depend proportionally on the duty of the pulse signal while the duty is very close to 0% or very close to 100%. As explanatorily shown in FIG. 2, the flow rate becomes zero (minimized) not only when the duty is strictly 0% but also when the duty takes any value within the range between 0% and a critical value $t_1$ which is a few percent. Similarly, the flow rate becomes maximum when the duty falls within the range between 100% and $(100-t_2)\%$, where the value of $t_2$ is a few percent. The functioning characteristic shown in FIG. 2 has been confirmed experimentally and is common to conventional electromagnetic flow control valves of the on-off functioning type. A primary cause of the minimizing and maximizing of the flow rate in the duty value ranges of 0% to $t_1$ and $(100-t_2)\%$ to 100% is the inertia of the iron core 18, diaphragm 16 and valve member 24.

According to the present invention, the duty of the control pulse signal to the electromagnetic valve 10 is made to be neither strictly 0% nor strictly 100% even when it is intended to minimize or maximize the flow rate. Instead, the flow rate is minimized (or maximized depending on the design of the electromagnetic valve) by making the duty of the control pulse signal take a value which is greater than 0% but is not greater than the critical value $t_1\%$, and maximized (or minimized depending on the design of the electromagnetic valve) by making the duty take another value which is not smaller than the critical value $t_2$ but is smaller than 100%. For majority of conventional electromagnetic valves of the on-off functioning type, both $t_1$ and $t_2$ are numerically about 3%. Accordingly, the duty of a control pulse signal in a method of the invention is regulated within the range of, as a typical example, 2-98%.

Figure 3:
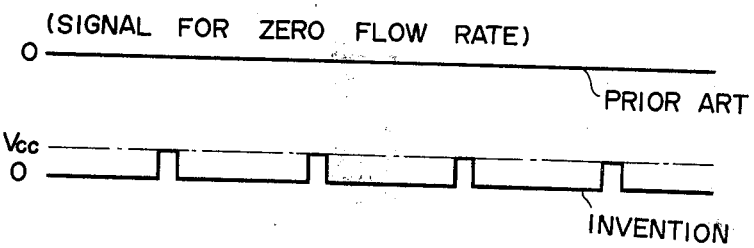
FIGS. 3 and 4 show differences between the control method according to the invention and the prior art method in the form of control signals supplied to the electromagnetic valve of FIG. 1 to minimize and maximize the rate of a fluid flow under the control of the electromagnetic valve.
Figure 4:
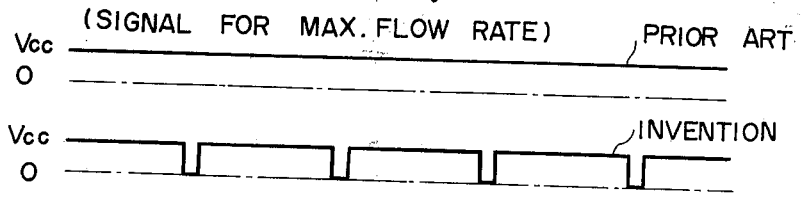

As illustrated in FIG. 3, a control pulse signal for the operation of the electromagnetic valve 10 of FIG. 1 turns into a continuous zero volt signal when the duty of the pulse signal is made to be 0% in order to minimize the flow rate through the port 28. In contrast, in a method of the invention the flow rate is minimized by the application of a pulse signal of which duty value is, for example, 2%, so that a voltage $V_{cc}$ (the amplitude of the pulses) appears at the input terminals of the electromagnetic valve 10 in accordance with the frequency of the pulse signal. FIG. 4 illustrates signal forms in the case of maximizing the flow rate through the port 28 in FIG. 1. In the conventional method the pulse signal turns into a continuous high level ($V_{cc}$ volt) signal as a natural consequence of making the duty of the pulse signal strictly 100%. In the present invention, the control signal in this case is a pulse signal of which duty is, for example, 98%, meaning that the voltage $V_{cc}$ intermittently disappears in accordance with the frequency of the pulse signal.

In the conventional method, the zero volt signal shown in FIG. 3 can hardly be discriminated from a failure of the control circuit 22 in producing an intended pulse signal, and also it is difficult to quickly ascertain that the continuous high level signal shown in FIG. 4 is not the result of malfunction of the control circuit 22 but is a proper signal of which duty has reached 100%. In the method of the invention, it is quite easy to examine properness of either the 2% duty pulse signal of FIG. 3 or the 98% duty pulse signal of FIG. 4 by examining intermittent changes in the voltage at the terminals of the electromagnetic valve 10 with an ordinary instrument such as a counter.

Figure 5:
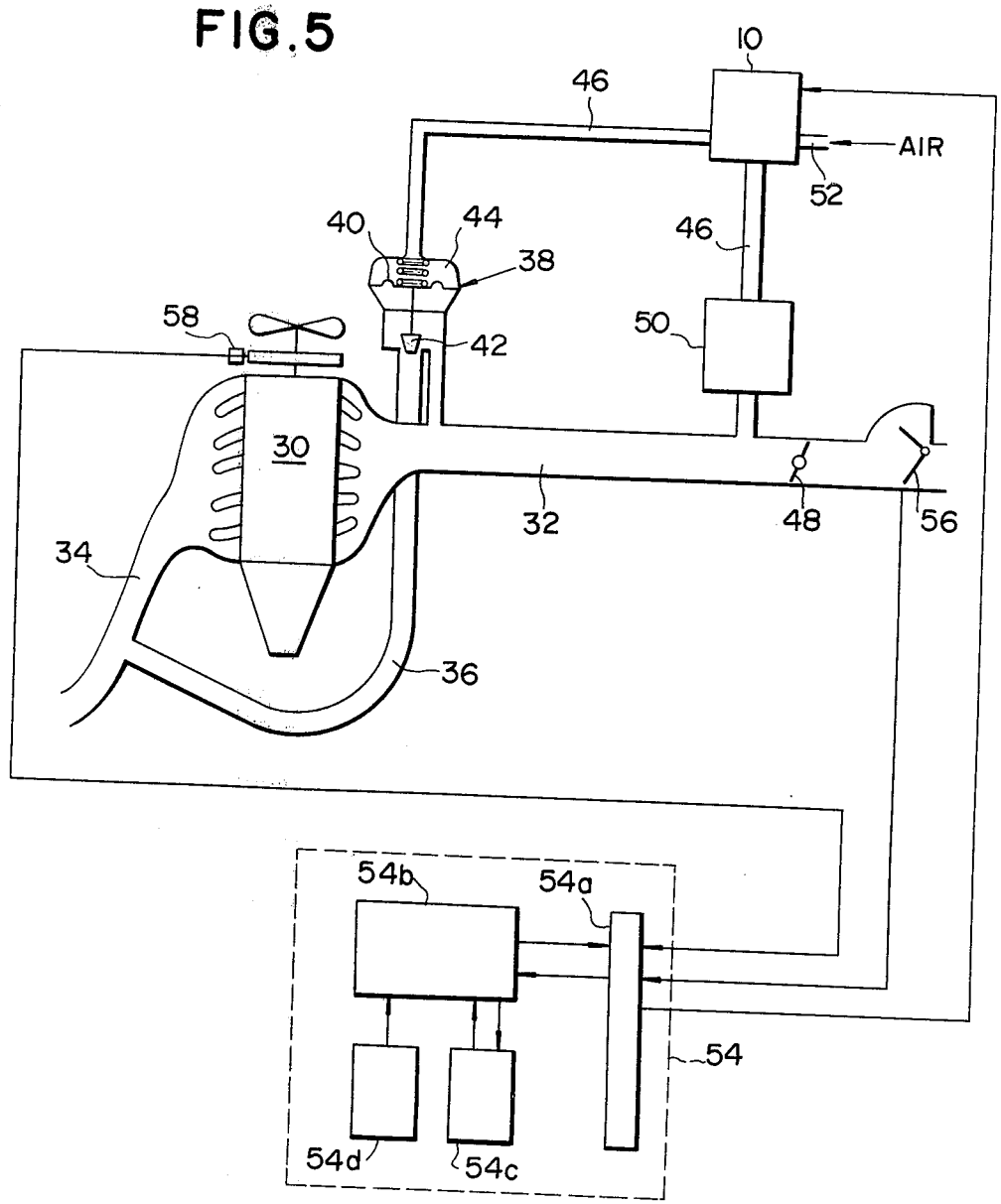
FIG. 5 is a diagrammatic presentation of an exhaust gas recirculation system for an internal combustion engine to which is applied the control method according to the invention.

FIG. 5 shows an automotive internal combustion engine 30 provided with an exhaust gas recirculation system to which is applied the flow rate control method of the present invention as an example of practical applications of this method. Indicated at 32 is a primary induction passage for this engine 30 and at 34 is an exhaust passage. To recirculate a portion of the exhaust gas through the combustion chambers of the engine 30 with the object of reducing the emission of nitrogen oxides, an exhaust gas recirculation passage 36 branches from the exhaust passage 34 and is connected to the induction passage 32 at a section downstream from a main throttle valve 48. The recirculation passage 36 is provided with a flow control valve 38 to vary the flow rate of the exhaust gas recirculated through this passage 36 depending on the operating condition of the engine 30.

The control valve 38 is of a known vacuum-operated type having a flexible diaphragm 40 which supports a valve member 42 and on the opposite side defines a vacuum chamber 44, so that the valve opening degree depends on the magnitude of vacuum applied to the vacuum chamber 44. A vacuum-transmitting passage 46 terminating at this chamber 44 branches from the induction passage 32 at a section downstream from the throttle valve 48 where a vacuum of variable magnitude is created during operation of the engine 30. An intermediate section of this passage 46 is formed to constitute a vacuum reservoir 50 to obtain a practically constant magnitude of vacuum, and between the vacuum reservoir 50 and the vacuum chamber 44 an electromagnetic valve 10 is associated with this passage 46 in order to introduce a variable quantity of atmospheric air into this passage 46 through a port 52 thereby to modulate the magnitude of vacuum transmitted from the reservoir 50 to the vacuum chamber 44. This electromagnetic valve 10 is of the on-off functioning type having a fundamental construction as illustrated in FIG. 1, and a control circuit 54 provides a constant frequency pulse signal to the electromagnetic valve 10 as a control signal to regulate the rate of air introduction into the vacuum passage 46 via the electromagnetic valve 10 such that the rate of exhaust gas recirculation through the passage 36 determined by the opening degree of the vacuum-operated flow control valve 38 is optimumly regulated according as the operating condition of the engine 30 varies.

The exhaust gas recirculation system includes several sensors each of which senses one of the parameters of operating conditions of the engine 30 and produces an electrical signal representative of the sensed parameter, such as an air flow rate sensor 56 to detect the quantity of air drawn into the induction passage 32 and an engine revolution rate sensor 58. The data signals produced by these sensors 56, 58 are put into the control circuit 54, which comprises an input-output circuit 54a, microprocessor 54b, memory 54c and pulse generator 54d. The control circuit 54 has the functions of memorizing an optimumly framed pattern of the rate of exhaust gas recirculation with respect to operating conditions of the engine 30, finding the engine operating condition at any moment based on the outputs of the sensors 56, 58, choosing an exhaust gas recirculation rate appropriate under the engine operating condition thus found by referring to the memorized pattern, and determining a standard duty value, meaning a particular value of the duty necessary for realization of the chosen exhaust gas recirculation rate, of the pulse signal the control circuit 54 provides to the electromagnetic valve 10. In the control circuit 54, a signal indicative of this standard duty value is multiplied by a corrective factor for enabling the resultant signal to drive the electromagnetic valve 10.

Figure 6:
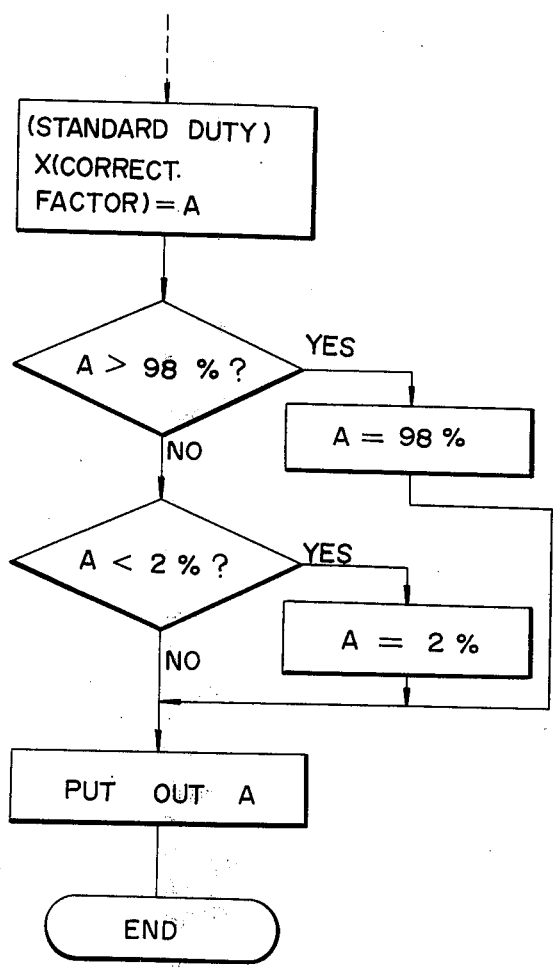
FIG. 6 is a part of a flow chart showing the function of a control unit in the system of FIG. 5.

Fundamentally, this modulation is the final step of producing a pulse signal for controlling the electromagnetic valve 10. According to the present invention, however, the signal after multiplication by the corrective factor is subjected to a logical operation as represented by the flow chart of FIG. 6 in order to avoid that the duty of the control pulse signal becomes 100% where it is intended to maximize the flow rate of air through the electromagnetic valve 10 or becomes 0% where intended to minimize (to render zero) the air flow rate. As can be seen in the flow chart of FIG. 6, the modulated duty value "A" becomes the duty of the control pulse signal, output of the control circuit 54, with no further modulation insofar as the duty value "A" falls in a range between a predetermined upper boundary value such as 98% (a value slightly smaller than 100%) and a predetermined lower boundary value such as 2% (a value slightly greater than 0%). The program of the logical operation is formulated so as to hold the duty of the control pulse signal as the output of the control circuit 54 at the upper boundary value (e.g. 98%) while the duty value "A" is greater than the upper boundary value and at the lower boundary value (e.g. 2%) while the duty value "A" is smaller than the lower boundary value.

From the preceding explanation with reference to FIGS. 1–4, it will ready be understood that the rate of air admission into the vacuum-transmitting passage 46 in FIG. 5 via the electromagnetic valve 10 can be maximized (so that the rate of exhaust gas recirculation through the passage 36 is minimized) even by keeping the duty of the control pulse signal at 98%, not at 0%, and can be minimized or rendered zero (so that the rate of exhaust gas recirculation is maximized) even by keeping the duty of the pulse signal at 2%, not 0%.

The employment of the above described method for the control of the operation of the electromagnetic valve 10 makes it possible to easily and correctly check whether the electromagnetic valve 10 and the control circuit 54 are properly functioning irrespective of operating conditions of the electromagnetic valve 10 and, therefore, facilitates inspection, maintenance and tuning of the overall engine system including the exhaust gas recirculation system.

What is claimed is:

1. In a method of controlling the rate of flow of a fluid by operating an electromagnetic flow control valve of the on-off functioning type with a constant frequency pulse signal and regulating the duty of the pulse signal thereby regulating the proportion of the duration of the open state and duration of the closed state of the electromagnetic valve, the improvement comprising the minimum value of the duty of said pulse signal for minimizing, or maximizing, said rate of flow being made to be a predetermined definite value greater than 0% but not greater than a first critical value which is slightly greater than 0%, and the maximum value of the duty of said pulse signal for maximizing, or minimizing, said rate of flow being made to be a predetermined definite value smaller than 100% but not smaller than a second critical value which is slightly smaller than 100%.

2. A control method according to claim 1, wherein said first critical value is 3% and said second critical value is 97%.

3. In a flow rate control system having a fluid passage, an electromagnetic flow control valve of the on-off function type associated with said fluid passage so as to vary the rate of flow of a fluid through said passage according to the proportion of the duration of the open state to duration of the closed state of said electromagnetic valve and a control means for providing a constant frequency pulse signal to said electromagnetic valve and regulating the duty of said pulse signal thereby regulating said proportion, the improvement comprising said control means including means for ensuring that the minimum value of the duty of said pulse signal for minimizing, or maximizing, said rate of flow is made to be a predetermined definite value greater than 0% but not greater than a first critical value which is slightly greater than 0% and that the maximum value of the duty of said pulse signal for maximizing, or minimizing, said rate of flow is made to be a predetermined definite value smaller than 100% but not smaller than a second critical value which is slightly smaller than 100%.

4. A control system according to claim 3, wherein said first critical value is 3% and said second critical value is 97%.

5. A control system according to claim 3, wherein said control means comprise first means for determining a provisional value of the duty based on a desired value of said rate of flow, second means for comparing said provisional value with both of the predetermined minimum and maximum values of the duty and employing said provisional value as the duty value of said pulse signal only when said provisional value is in the range between the predetermined minimum and maximum values of the duty but employing the predetermined minimum value of the duty as the duty value of said pulse signal when said provisional value is smaller than the predetermined minimum value of the duty and employing the predetermined maximum value of the duty as the duty value of said pulse signal when said provisional value is greater than the predetermined maximum value of the duty.

6. In an exhaust gas recirculation control system for an internal combustion engine, the control system having an exhaust recirculation passage which branches from an exhaust passage for the engine and is connected to an induction passage for the engine to recirculate a portion of the exhaust gas through the combustion chambers of the engine, and an electro-magnetic flow control valve of the on-off functioning type associated with said recirculation passage so as to vary the rate of flow of the exhaust gas through said recirculation passage according to the proportion of the open state to duration of the closed state of said electro-magnetic valve and a control means for providing a constant frequency pulse signal to said electro-magnetic valve and regulating the duty of said pulse signal thereby regulating said proportion:

the improvement comprising said control means being constructed such that the minimum value of the duty of said pulse signal for minimizing, or maximizing said rate of flow is made to be greater than zero percent but not greater than a first critical value which is slightly greater than zero percent and that the maximum value of the duty of said pulse signal for maximizing, or minimizing, said rate of flow is made to be smaller than 100 percent but not smaller than a second critical value which is slightly smaller than 100 percent.

7. A control system according to claim 6, wherein said first critical value is 3 percent and said second critical value is 97 percent.

8. A control system according to claim 7, wherein the minimum and the maximum values of the duty cycle are respectively predetermined definite values.

9. A control system according to claim 8, wherein said control means comprise first means for determining a provisional value of the duty based on a desired value of said rate of flow, second means for comparing said provisional value with both of the predetermined minimum and maximum values of the duty and employing said provisional value as the duty value of said pulse signal only when said provisional value is in the range between the predetermined minimum and maximum values of the duty as the duty value of said pulse signal when said provisional value is smaller than the predetermined minimum value of the duty and employing the predetermined maximum value of the duty as the duty value of said pulse signal when said provisional value is greater than the predetermined maximum value of the duty.

* * * * *